United States Patent [19]

Kemper et al.

[11] 4,258,581

[45] Mar. 31, 1981

[54] COUNTERBALANCING SYSTEM FOR NUTATIONAL TRACTION DRIVE TRANSMISSIONS

[75] Inventors: Yves J. Kemper; Harvey N. Pouliot, both of Birmingham, Mich.

[73] Assignee: Vadetec Corporation, Troy, Mich.

[21] Appl. No.: 77,780

[22] Filed: Sep. 21, 1979

[51] Int. Cl.³ ............................................. F16H 15/16
[52] U.S. Cl. ........................................ 74/192; 74/212
[58] Field of Search ................... 74/190, 191, 192, 212

[56] References Cited

U.S. PATENT DOCUMENTS

| Re. 29,328 | 8/1977 | Kemper | 74/190 |
|---|---|---|---|
| 2,584,541 | 2/1952 | Brobeck | 74/191 |
| 4,112,780 | 9/1978 | Kemper et al. | 74/190 |
| 4,152,946 | 5/1979 | Kemper | 74/193 |
| 4,208,926 | 6/1980 | Hanson | 74/191 |

Primary Examiner—Kenneth Dorner
Attorney, Agent, or Firm—Robert F. Ziems

[57] ABSTRACT

A counterbalancing system for continuously variable torque transmissions of the type in which one of two working bodies, between which torque is transmitted by rolling friction, undergoes a nutational movement to generate an inertial couple which is variable with an output speed varying component of the transmission. The system includes a pair of variably positioned counterweights connected for movement directly with the speed varying mechanism of the transmission in a manner such that at least the variable component of the inertial couple is substantially counterbalanced for all speed ratios of the transmission.

7 Claims, 4 Drawing Figures

COUNTERBALANCING SYSTEM FOR NUTATIONAL TRACTION DRIVE TRANSMISSIONS

BACKGROUND OF THE INVENTION

This invention relates to continuously variable transmissions and more particularly, it concerns an adjustable counterbalancing system for such transmissions in which torque is transmitted by friction to or from a body exhibiting inertial forces which vary with the speed ratio at which power is transmitted.

In commonly-assigned U.S. Pat. Nos. Re 29,328 and 4,152,946, several embodiments of continuously variable, mechanical power transmissions are disclosed in which three frame supported working bodies operate to transmit a mechanical power input to a rotatable output at infinitely variable output/input speed ratios within the design range of the transmission. For purposes of definition in this background discussion as well as in the ensuing detailed description of the present invention and in the appended claims, the three working bodies may be termed, respectively, an "alpha body" which is supported by the transmission frame to be concentric with a first axis, a "beta body" which is supported by the alpha body to be concentric with a second axis inclined with respect to and intersecting the first axis at a point of axes intersection, and an "omega body" carried by the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission.

It is to be noted that the terms "alpha body," "beta body" and "omega body" are completely arbitrary and as such, do not restrict the components designated thereby either to the class of transmission represented by the disclosure of the aforementioned application or to specific structure to be described hereinafter. The terms will, however, lend consistency of definition in the description to follow and facilitate an understanding of various speed relationships to be expressed by algebraic equations.

The continuously variable speed ratio capability of such transmissions is achieved by providing one of the beta and omega bodies with a pair of rolling or traction surfaces which are of revolution about the concentric body axis and which are of variable radii along that axis in symmetry with the point of first and second axes intersection. Physically, such rolling surfaces will thus provide the one body with a biconical-like configuration. The other of the beta and omega bodies is provided with a pair of rolling or traction surfaces which are also of revolution about the concentric body axis but which are of relatively constant radius. The pairs of rolling surfaces on the beta and omega bodies are retained in frictional engagement with each other at two contact points or zones capable of positional adjustment to vary the ratio of the beta body surface radius ($R_b$) to the omega body surface radius ($R_w$). Thus, if the alpha body is rotatable at a velocity ($\dot{\alpha}$) about the first axis, the rotational speed of the beta body about the second axis in a fixed frame of reference is ($\dot{\beta}$) and the rotational speed of the omega body on the first axis is ($\dot{\omega}$), then the respective speeds of the three bodies are related by the following equation:

$$\dot{\omega} - \dot{\alpha} + (\dot{\alpha} - \dot{\beta})R_b/R_w = 0. \tag{1}$$

Because one of either the beta or the omega body extends within the other of such bodies, the radius ratio $R_b/R_w$ may represent a value of either less than 1 (where $R_b$ is always less than $R_w$) or more than 1 (where $R_b$ is always greater than $R_w$). The function $\rho$ will be used hereinafter to designate either $R_b/R_w$ or the reciprocal $R_w/R_b$, whichever is greater than 1, it being understood that $\rho$ or its reciprocal $1/\rho$ are used appropriately.

In several of the transmission embodiments disclosed in the aforementioned U.S. patents, the normal force by which the rolling surfaces on the respective beta and omega bodies are retained in frictional contact is developed solely by an inertial couple tending to tilt the beta body into the omega body. In other embodiments, this normal force is developed mechanically such as by forcibly separating a pair of oppositely convergent conical members constituting the biconical beta or omega body, preferably under a force proportional to output torque. In these latter embodiments, the same inertial couple is deployed to oppose a rocking couple resulting from the mechanically developed normal force so that the loading on bearings due to the rocking couple is reduced or offset by the inertial couple.

The magnitude of the inertial couple in a given transmission design may be determined by the equation:

$$C1 = [(I_1 - I_3)\dot{\alpha}^2 \sin \alpha \cos \alpha] - [I_3 \dot{\alpha}(\dot{\alpha} - \dot{\beta}) \sin \alpha]. \tag{2}$$

In this equation, C1 is the inertial couple, $I_1$ is the moment of inertia of the beta body relative to the second axis, $I_3$ is the moment of inertia of the beta body relative to an axis perpendicular to the second axis at the point of axes intersection and $\alpha$ is the angle at which the first and second axes intersect. The remaining functions in equation (2) are the same as those used in equation (1).

If it is assumed that the transmission is operated at a constant input speed $\dot{\alpha}$ and that in the transmission, the angle $\alpha$ is fixed, then the first bracketed function on the right side of equation (2) is constant. As such, that portion of the inertial couple attributed to this function may be precisely counterbalanced by an appropriate fixed distribution of mass in the alpha body. Also, the second bracketed function in equation (2) may be constant in transmission designs in which the beta body is retained against rotation on the second axis so that $\dot{\beta}=0$. Such transmission designs are disclosed in U.S. Pat. No. 4,152,946 and operate to transmit power from the alpha body to the omega body, the latter being the output of the transmission and variable in accordance with the equation:

$$\dot{\omega} = \dot{\alpha}(1-\rho). \tag{3}$$

A generally preferred mode of operating such transmissions has been to apply an input torque to the alpha body to carry the beta body in nutation and hold the omega body against rotation ($\dot{\omega}=0$). The beta body is linked with an output shaft rotatable on the first axis by gearing having a ratio factor (k) which theoretically may be of any value and also may be made either positive or negative depending on the particular gearing arrangement used. In light of the foregoing, where $\dot{\theta}$ is unit output speed and taking into account the gearing ratio (k), the output/input speed ratio of the unit is determined by an equation:

$$\overset{\circ}{\theta}/\overset{\circ}{\alpha} = 1 - k\rho. \tag{4}$$

A principal advantage of operating in the mode represented by equation (4) is that the physical parameters of such I.V. transmissions readily accommodate a range of values for the function (kρ) which permit a continuously variable output/input speed ratio range of from zero to 1 (1.0<kρ<2.0). Also, this range may be shifted to include an output reversal through zero merely by selecting a gear ratio (k) so that the function (kρ) brackets a numerical value of 1 (e.g. 1.5>kρ>0.7).

In transmissions which operate to vary speed ratios in accordance with equation (4), the second bracketed function on the right side of equation (2) will vary with the speed $\overset{\circ}{\beta}$ at which the beta body rotates about the second axis in a fixed frame of reference and as determined by the variable factor ρ. Since the factors $\overset{\circ}{\beta}$ and ρ are determinative of transmission output speed, a fixed counterweight system is, therefore, effective to balance that portion of the inertial couple represented by the second function to the right of equation (2) at only one output speed.

The result of any imbalance between the inertial couple developed in the beta body and a counterbalancing couple developed by fixed counterweights on the alpha body is a net nutational couple which behaves physically in a manner resembling a pair of axially spaced, rotatable weights displaced eccentrically from the rotational axis thereof at an angle of 180°. Such a net nutational couple is a source of vibration particularly at high output speeds.

The vibration resulting from the aforementioned net nutational couple has been reduced heretofore by appropriate fixed counterweight designs so that the vibration can be tolerated in many applications where the transmission is capable of being supported in a manner to damp the vibrations or where output speeds are relatively low. In many applications where the advantages of operation to vary speed ratio in accordance with equation (4) are desirably combined with reduced or no vibration, further provision for counterbalancing must be made.

SUMMARY OF THE INVENTION

In accordance with the present invention, the nutational couple resulting from the combined nutating movement and variable speed rotation of the beta body in the aforementioned class of continuously variable transmissions is substantially counterbalanced for all transmission speed ratios by a movable counterweight system positioned directly by the mechanism which adjusts the transmission speed ratios. Thus, where the omega body of the transmission is constituted by a pair of rings circumscribing the alpha and beta bodies, the movable counterweights are carried slidably in undercut guideways extending along the alpha body and connected directly to the omega rings. By proper selection of movable counterweight mass and position relative to the omega rings, the couple resulting from centrifugal force acting on a combination of fixed and movable counterweights rotatable directly with the alpha body will oppose with substantial equality the nutational couple of the beta body at all speeds.

A principle object of the present invention is the reduction of vibration in continuously variable transmissions of the type mentioned. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
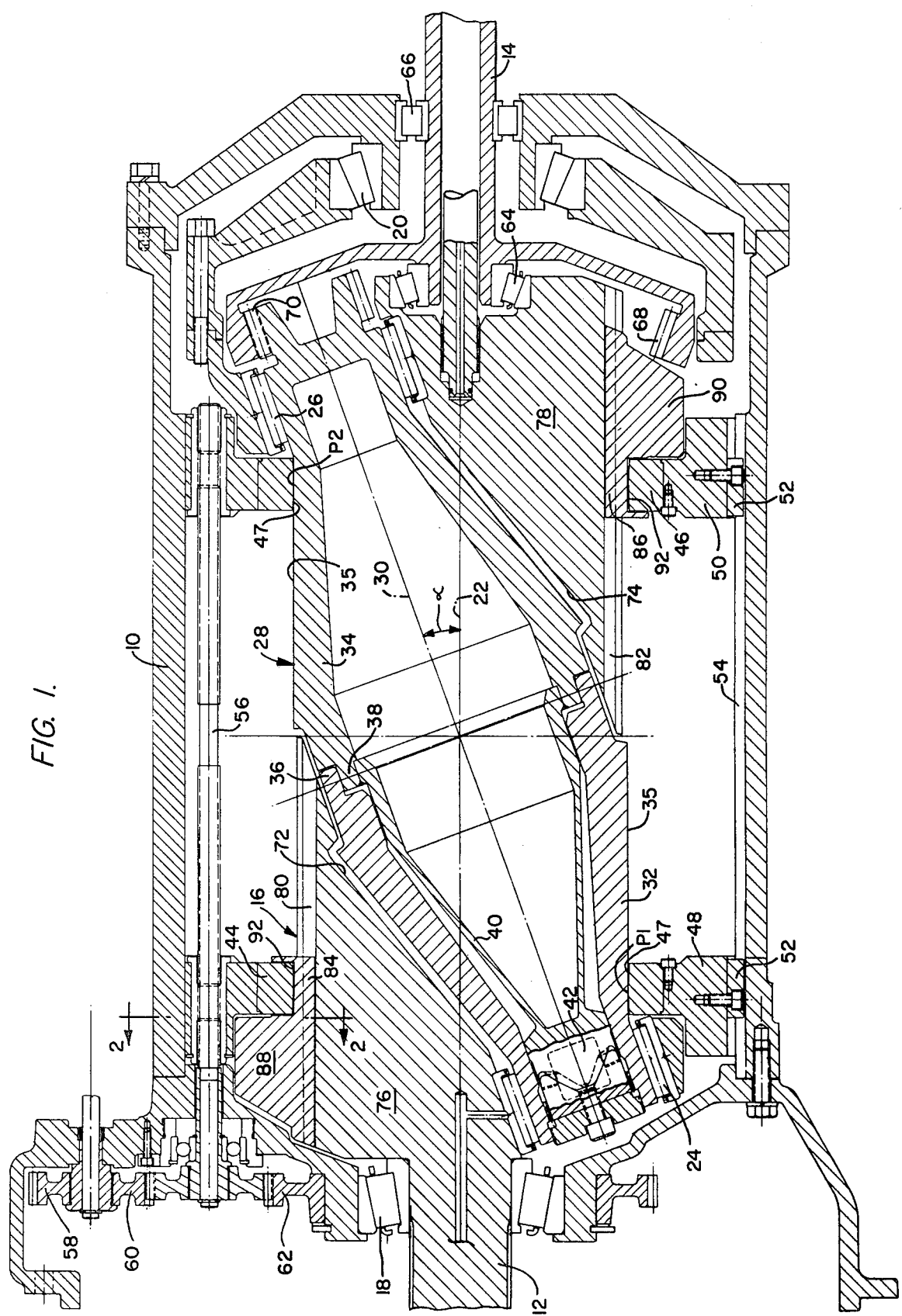
FIG. 1 is a longitudinal cross-section through a continuously variable transmission unit incorporating the counterbalancing system of the present invention.

In FIG. 1 of the drawings, a continuously variable transmission unit is shown to include a frame 10, a rotatable input shaft 12 and a rotatable output shaft 14. The input shaft 12 is formed as an integral extension of an alpha body generally designated by the reference numeral 16 and supported by the frame 10 through bearings 18 and 20 for rotation about a primary or first transmission axis 22. Although the alpha body 16 will be described in more detail below, it may be noted at this point that the alpha body 16 includes bearings 24 and 26 for rotatably carrying a beta body 28 on a second axis 30 intersecting the first axis 22 at a point S of axes intersection and at an angle α.

The construction of the beta body 28 is described in detail in a commonly assigned copending U.S. patent application Ser. No. (77,833) filed concurrently herewith by the sole inventor, Yves Jean Kemper. It will suffice for purposes of a complete understanding of the present invention, however, to note that the beta body 28 in the illustrated embodiment is a biconical body comprised of a pair of cone members 32 and 34 defining two beta rolling surfaces 35 of revolution about the second axis 30 and connected for relative rotation and axial sliding movement at their base ends by telescopic sleeve portions 36 and 38, respectively. A pilot cone 40 is rigidly secured, such as by welding, to the cone member 34 and extends at its small end to a cam assembly 42 which functions to develop an axial separating force on the cone members in response to a torque differential between the cone members.

The assembly of the alpha body 16 and the beta body 28 is circumscribed by a pair of omega rings 44 and 46 rigidly secured in annular carriages 48 and 50 which are slidable relative to the frame 10 but secured against rotation with respect to the frame by guide lugs 52 engaging in a longitudinal slot 54. In the context of terms used above to characterize the general class of transmission represented by the illustrated embodiment, the omega rings 44 and 46 together with the frame 10, being rotatably coupled, constitute an omega body having omega rolling surfaces 47 of revolution about the first axis 22.

The omega rings 44 and 46 are concentric with the first axis 22 and movable along that axis toward and away from each other by rotation of one or more double pitched screws 56 threadably received in the annular carriages 48 and 50. The screws 56 are rotated by an external control (not shown) through gears 58 and 60 rotatably supported by the frame 10. A coupling gear 62 which is rotatable with respect to the frame 10, is driven by the gear 60 and operative to synchronize the rotation of one or more additional double pitched screws 56 positioned about the inner periphery of the frame 10.

The output shaft 14 is supported by bearings 64 and 66 for rotation on the first axis 22 relative to the alpha body 16 and the frame 10, respectively. The shaft 14 is coupled integrally with a ring gear 68 in mesh with a pinion gear 70 coupled nonrotatably to the beta body 28. In the particular embodiment illustrated, the pinion gear 70 is an integral extension of the cone member 34. Also and as disclosed more fully in the aforementioned copending application Ser. No. (77,833) the connection of the cone member 32 with the pinion gear 70 through the ramp assembly 42, the pilot cone 40 and the cone member 34 operate upon the occurrence of a load developed torque differential between the cone members 32 and 34 to forcibly separate the cone members 30 and 32 and generate a normal force by which the exterior conical or beta surfaces 35 on the cone members 32 and 34 are forced against the internal omega surfaces 47 on the omega rings 44 and 46 at two diametrically opposite points of contact P1 and P2 in proportion to the torque load imposed on the pinion gear 70.

In the operation of the illustrated transmission embodiment, the input shaft 12 drives the alpha body 16 in rotation about the first axis 22 and carries the beta body 28 in nutation such that the second axis 30 travels in a biconical path about the first axis 22. This motion of the beta body 28 causes the drive pinion 70 to orbit or travel in planetary fashion about the first axis 22. The frictional engagement of the beta surfaces 35 on the cone members 32 and 34 with the omega surfaces 47 on the rings 44 and 46 causes the beta body 28 to be rotated on the axis 30 at variable speeds depending on the axial location of the omega rings relative to the point S. Thus, if the ratio of the radius of omega surfaces 47 to the radius of the beta surfaces 35 at the two points of contact between these surfaces is $\rho$ and the diametric ratio of the drive pinion 70 to the ring gear 68 is k, the output shaft 14 may be driven at continuously variable speeds relative to the speed of input shaft rotation in accordance with equation (4) given above.

The structure of the alpha body 16 is in major part a solid cylindrical turning truncated by frusto-conical cavities 72 and 74 to receive the cone members 32 and 34. As a result of this structure, the distribution of mass in the alpha body 16 is concentrated in two axially spaced, diametrically opposite sections 76 and 78. These sections, in themselves, represent a pair of fixed counterweights and are effective as such in a manner to be described in more detail below.

Figure 2:
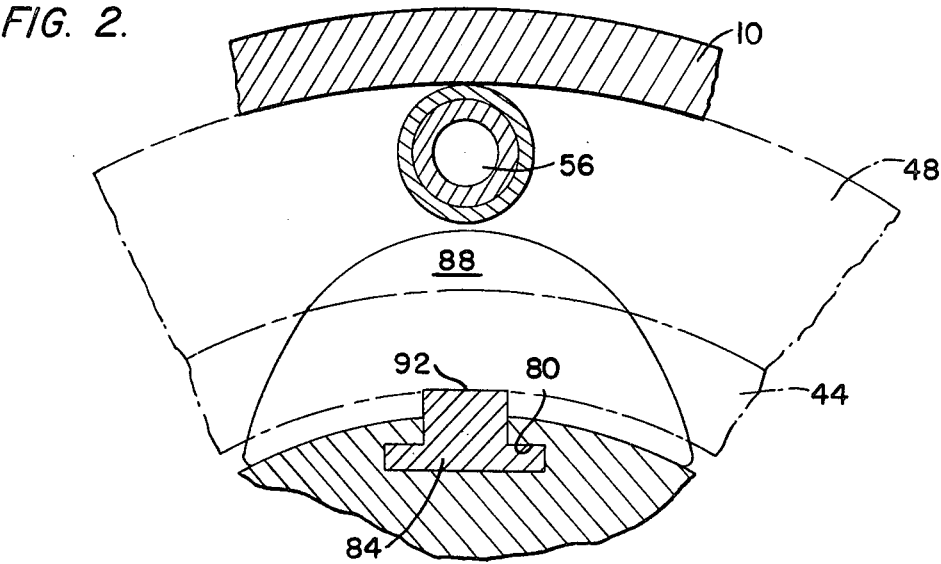
FIG. 2 is an enlarged fragmentary cross-section on line 2—2 of FIG. 1.

In accordance with the present invention, the peripheral portion of the alpha body sections 76 and 78 opposite from the cavities 72 and 74 are formed with undercut grooves 80 and 82 extending along the half-length of the body in parallel relationship to the first axis 22. As shown in FIG. 2, the grooves 80 and 82 receive tenon-like carriage portions 84 and 86 integral with movable counterweights 88 and 90. The counterweights 88, 90 are shaped to provide an arcuate groove 92 generally complementing the cross-sectional configuration of the omega rings 44 and 46. Thus, and as shown in FIG. 1, the counterweights 88 and 90 will be carried axially along the grooves 80 and 82 directly by movement of the omega rings 44 and 46 with the carriages 48 and 50 under the control of the double pitched screw threads 56. By proper dimensioning of the grooves 92 relative to the rings 44 and 46, rotation of the alpha body 16 and of the counterweights 88 and 90 relative to the rings will be unimpeded. Also it will be noted that like the alpha body sections 76 and 78, the movable counterweights 88 and 90 are positioned to be diametrically opposite from the points of contact P1 and P2 though variably so positioned as a result of axial movement along the grooves 80 and 82.

Figure 3:
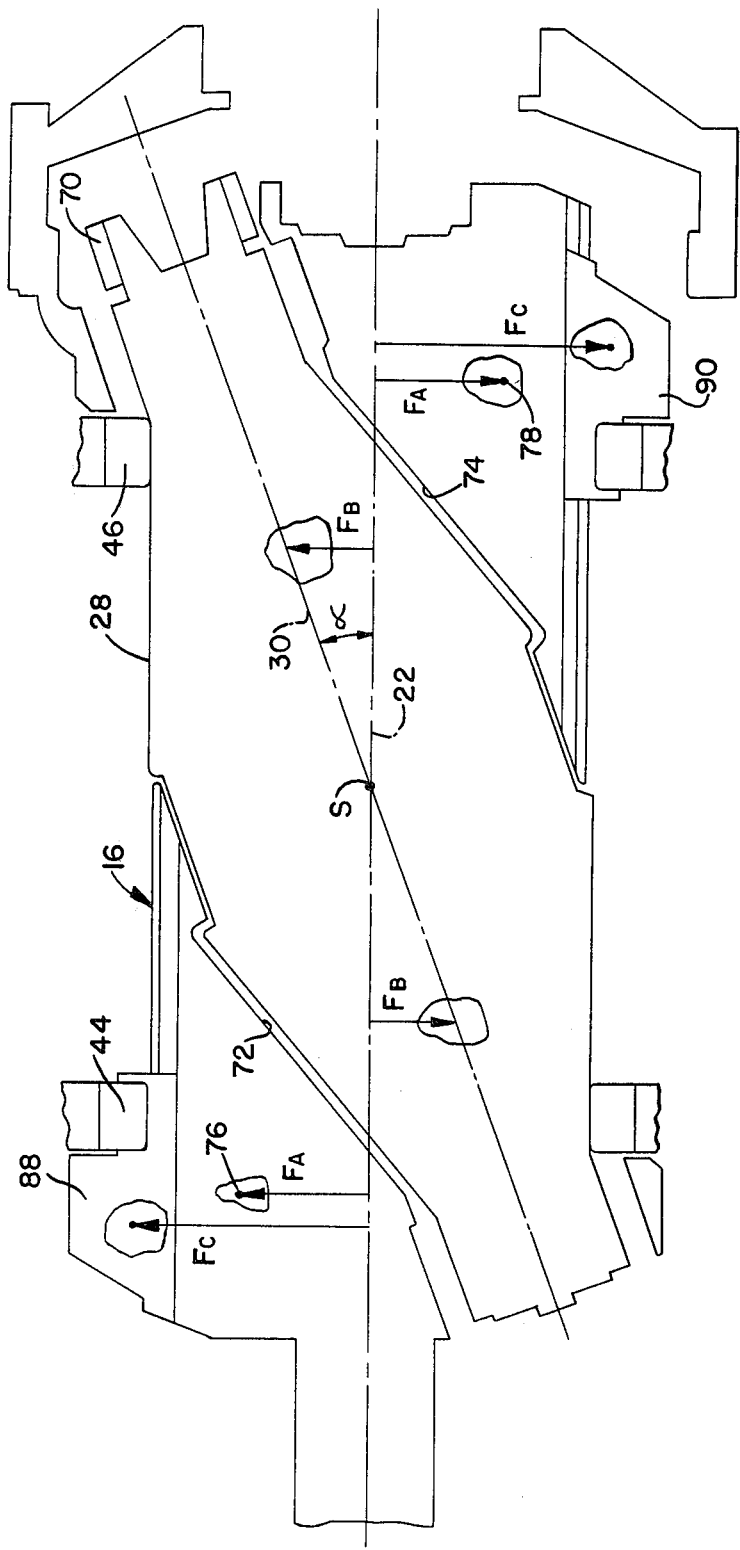
FIG. 3 is a schematic cross-section in which the various major couples developed during operation of the transmission are superimposed on outlines of parts illustrated in FIG. 1.

The inertial forces acting on the alpha body 16, the beta body 28 and the movable counterweights 88 and 90 may be understood by reference to FIG. 3 of the drawings. In particular, these inertial forces are represented by three couples acting about an axis through the point S and perpendicular to a plane containing both the first and second axes 22 and 30; namely, a beta body couple $F_B$—$F_B$ which is the couple C1 in equation (2) given above, a fixed counterweight couple $F_A$—$F_A$, and a movable counterweight couple $F_C$—$F_C$. The fixed and movable counterweight couples act in the same direction which is opposite to the direction of the beta body couple $F_B$—$F_B$.

As explained above with respect to equation (2) when the alpha body 16 is driven at a constant input speed and because the angle $\alpha$ subtending the axes 22 and 30 is fixed, the first bracketed function to the right of equation (2) is constant. Thus, that portion of the beta body couple $F_B$—$F_B$ attributable to the first bracketed function may be counterbalanced effectively by the fixed distribution of mass in the alpha body 16 contributing to the couple $F_A$—$F_A$. The second bracketed function in equation (2) is variable with the speed $\dot{\beta}$ or the rotational velocity of the beta body 28 about the axis 30 in a fixed frame of reference. The speed $\dot{\beta}$, in turn, is variable with the axial positioning of the omega rings 44 and 46 along the axis 22 in symmetry with the point S. Because of the connection of the movable counterweights 88 and 90 directly with the omega rings 44 and 46, the arm of the movable counterweight couple $F_C$—$F_C$ will vary directly with the positioning of the omega rings and substantially directly with the velocity component $\dot{\beta}$.

Figure 4:
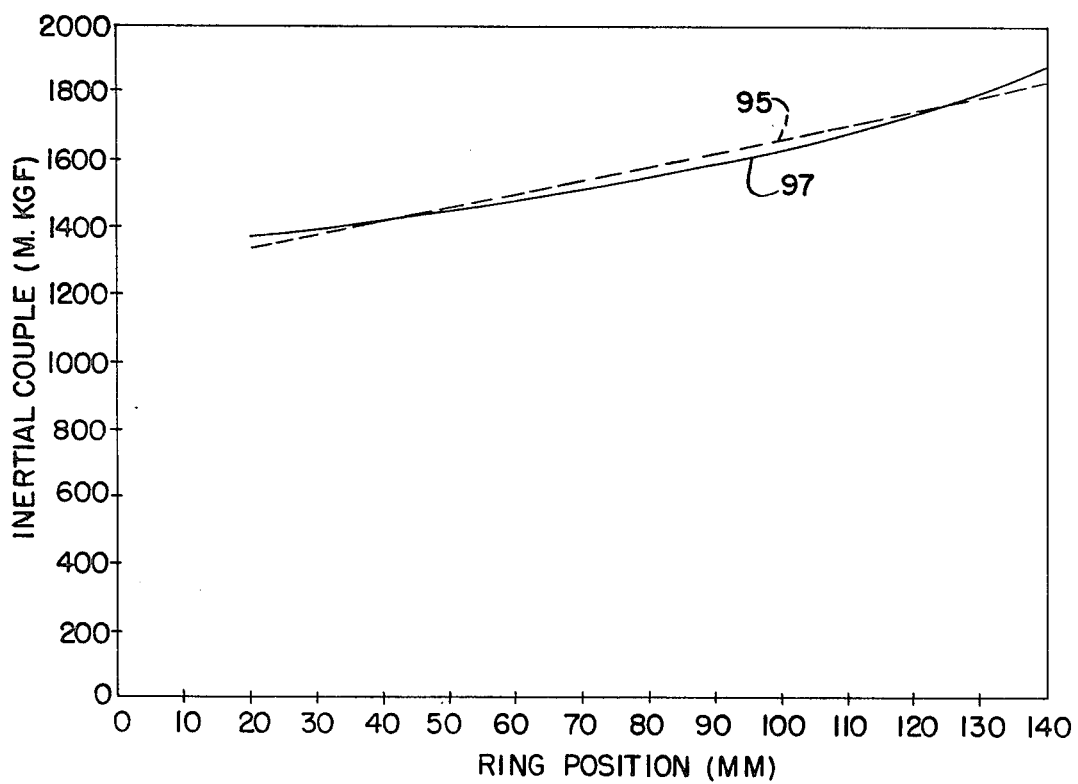
FIG. 4 is a graph in which curves representing inertial and counterbalancing couples are superimposed on one another.

In FIG. 4, variations in the magnitude of the combined couples $F_A$—$F_A$ and $F_C$—$F_C$ are plotted against variations in the spacing of the omega rings 44 and 46 from the point S of intersection and represented by the dashed line 95. The variation in the magnitude of the beta body couple $F_B$—$F_B$ for a variation in the velocity component $\dot{\beta}$ as determined by the same variation in ring position are represented by the solid curved line 97. The combined fixed and movable counterweight couple is variable linearly whereas the inertial beta body couple is variable nonlinearly or on the curve 97. Therefore, complete or total counterbalancing is not attained except at two positions of the omega rings where the lines 95 and 97 intersect. The two variables, however, are substantially coincident and have the effect of reducing a vibration causing net nutational couple by an order of magnitude over that possible by a fixed counterweight system alone. This substantial reduction in the net nutational couple is, moreover, accomplished by an extremely simple structure organization.

Thus, it will be appreciated that as a result of the present invention, a highly improved counterbalancing system is provided for continuously variable transmissions of the type mentioned and by which the objectives of the invention are fulfilled. It is contemplated and it will be apparent to those skilled in the art from the preceding description that modifications and/or changes may be made in the disclosed embodiment without departure from the invention. Accordingly, it is expressly intended that the foregoing description and accompanying drawing illustrations are representative of a preferred embodiment only, not limiting, and that the true spirit and scope of the present invention be determined by reference to the appended claims.

We claim:

1. In a continuously variable transmission unit including an alpha body rotatable on a first axis and drivably connected with a unit input, a beta body having a pair of beta rolling surfaces of revolution about a second axis, said beta body being carried by said alpha body so that said second axis is inclined with respect to and intersecting said first axis at a point of axes intersection, said beta body being rotatable on said second axis, and an omega body defining a pair of omega rolling surfaces of revolution about said first axis, one of said beta and omega rolling surfaces being of variable radii whereas the other of said rolling surfaces is of relatively constant radius, said rolling surfaces being in frictional engagement at each other at two diametrically opposite contact points located on opposite sides of said point of axes intersection, and means for adjusting the position of said contact points to vary the ratio of said rolling surface radii and the speed at which said beta body rotates about said second axis, the improvement comprising:
   a pair of counterweights movably supported by said alpha body to be variably positioned diametrically opposite from said points of contact; and
   means for adjusting the position of said counterweights in accordance with variations in the rotational speed of said beta body about said second axis in a fixed frame of reference.

2. The apparatus recited in claim 1, wherein said omega surfaces are of a fixed radius and movable axially toward and away from each other and in which said means for adjusting the position of said counterweights comprises means coupling said counterweights for direct axial movement with said rings while permitting rotation of said counterweights with said alpha body and relative to said rings.

3. The apparatus recited in claim 1, wherein said beta body develops an inertial couple about a third axis intersecting said point of axes intersection and perpendicular to a plane containing said first and second axes, said inertial couple being variable with the speed of rotation of said beta body about said second axis in a fixed frame of reference and in which said counterweights develop a balancing couple opposite to said interial couple and variable substantially in proportion with variations in said inertial couple.

4. The apparatus recited in claim 1, wherein said alpha body comprises means defining a fixed pair of mass concentrations diametrically opposite from said pair of contact points, wherein said beta body develops an inertial couple about a third axis intersecting said point of axes intersection and perpendicular to a plane containing said first and second axes, the magnitude of said inertial couple being a composite of constant and variable functions, the portion of said inertial couple resulting from said constant function being opposed by a first balancing couple developed by said pair of mass concentrations in said alpha body and the remaining portion of said inertial couple resulting from said variable function being opposed by a second balancing couple developed by said movable counterweights.

5. In a continuously variable transmission unit including an alpha body rotatable on a first axis and drivably connected with a unit input, a beta body having a pair of conical beta rolling surfaces of revolution about a second axis, said beta body being carried by said alpha body so that said second axis is inclined with respect to and intersecting said first axis at a point of axes intersection, said beta body being rotatable on said second axis, and a pair of omega rings surrounding said alpha and beta bodies and having omega rolling surfaces of revolution about said first axis, said rolling surfaces being in frictional engagement at each other at a pair of diametrically opposite contact points on opposite sides of said point of axes intersection, and means for axially adjusting said rings to vary the ratio of said rolling surface radii, the improvement comprising:
   a pair of counterweights movably supported by said alpha body to be variably positioned diametrically opposite from said points of contact; and
   means for adjusting the position of said counterweights in accordance with movement of said omega rings to vary the ratio of said rolling surface radii.

6. The apparatus recited by claim 5, wherein said counterweights are supported by said alpha body for movement along linear paths of movement parallel to said first axis.

7. The apparatus recited in claim 6, wherein said means for adjusting the position of said counterweights comprises means connecting said counterweights for direct axial movement with said omega rings.

* * * * *